US012381241B1

United States Patent
Jiao et al.

(10) Patent No.: US 12,381,241 B1
(45) Date of Patent: Aug. 5, 2025

(54) METHODS AND SYSTEMS FOR OPTIMIZING LIFETIME OF FUEL CELL SYSTEM BASED ON ADJUSTMENT AND CONSTRAINT OF THERMOELECTRIC RATIO

(71) Applicants: CATARC NEW ENERGY VEHICLE TEST CENTER (TIANJIN) CO., LTD., Tianjin (CN); CHINA AUTOMOTIVE TECHNOLOGY AND RESEARCH CENTER CO., LTD., Tianjin (CN)

(72) Inventors: Daokuan Jiao, Tianjin (CN); Dong Hao, Tianjin (CN); Yanyi Zhang, Tianjin (CN); Zhixin Wu, Tianjin (CN); Yongping Hou, Tianjin (CN); Zirong Yang, Tianjin (CN); Xin Zhao, Tianjin (CN); Jicheng Ma, Tianjin (CN); Ruidi Wang, Tianjin (CN)

(73) Assignees: CATARC NEW ENERGY VEHICLE TEST CENTER (TIANJIN) CO., LTD., Tianjin (CN); CHINA AUTOMOTIVE TECHNOLOGY AND RESEARCH CENTER CO., LTD., Tianjin (CN)

( * ) Notice: Subject to any disclaimer, the term of this patent is extended or adjusted under 35 U.S.C. 154(b) by 0 days.

(21) Appl. No.: 19/046,499

(22) Filed: Feb. 5, 2025

(30) Foreign Application Priority Data

Feb. 5, 2024 (CN) .......................... 202410167538.5

(51) Int. Cl.
*H01M 8/0438* (2016.01)
*H01M 8/0432* (2016.01)
(Continued)

(52) U.S. Cl.
CPC ..... *H01M 8/04992* (2013.01); *H01M 8/0432* (2013.01); *H01M 8/04417* (2013.01);
(Continued)

(58) Field of Classification Search
CPC .......... H01M 8/04992; H01M 8/0432; H01M 8/04417; H01M 8/04552; H01M 8/04582; H01M 8/04611
(Continued)

(56) References Cited

U.S. PATENT DOCUMENTS

2021/0320312 A1\* 10/2021 Pei ................... H01M 8/04873
2023/0420709 A1\* 12/2023 Yang ................ H01M 8/04589

FOREIGN PATENT DOCUMENTS

CN 112563543 B 6/2021
CN 114551945 A \* 5/2022 ........ H01M 8/04305
(Continued)

OTHER PUBLICATIONS

Decision to Grant a Patent in Chinese Application No. 202410167538.5 mailed on Mar. 27, 2024, 5 pages.

*Primary Examiner* — Christian Roldan
(74) *Attorney, Agent, or Firm* — Porus IP LLC

(57) ABSTRACT

A method and a system for optimizing a lifetime of a fuel cell system based on adjustment and constraint of a thermoelectric ratio are provided. The method includes obtaining initial reference voltages of a plurality of single-machine fuel cell systems, and performing a durability test under a normal operating condition to obtain variation relationships of reference voltage over time; monitoring an operating voltage of each of the single-machine fuel cell systems in real-time under the normal operating condition to obtain a real-time monitored voltage and a real-time voltage deviation; calculating a performance expected attenuation profile of each of the single-machine fuel cell systems under the
(Continued)

normal operating condition; obtaining current density distribution and actual available heat of each of the single-machine fuel cell systems, and calculating a health state boundary of each of the single-machine fuel cell systems in stable operation, so as to optimize operating modes of the systems.

3 Claims, 8 Drawing Sheets

(51) Int. Cl.
*H01M 8/04537* (2016.01)
*H01M 8/04992* (2016.01)

(52) U.S. Cl.
CPC ... *H01M 8/04552* (2013.01); *H01M 8/04582* (2013.01); *H01M 8/04611* (2013.01)

(58) Field of Classification Search
USPC .......................................................... 429/431
See application file for complete search history.

(56) References Cited

FOREIGN PATENT DOCUMENTS

| | | | | |
|---|---|---|---|---|
| CN | 114566686 A | * | 5/2022 | ........ H01M 8/04305 |
| CN | 114583221 A | | 6/2022 | |
| CN | 114924202 A | | 8/2022 | |
| CN | 115616435 A | | 1/2023 | |
| CN | 115663241 A | | 1/2023 | |
| CN | 116053531 A | | 5/2023 | |
| CN | 114566686 B | | 11/2023 | |
| CN | 117133950 A | | 11/2023 | |

* cited by examiner

//]: #

METHODS AND SYSTEMS FOR OPTIMIZING LIFETIME OF FUEL CELL SYSTEM BASED ON ADJUSTMENT AND CONSTRAINT OF THERMOELECTRIC RATIO

CROSS-REFERENCE TO RELATED APPLICATIONS

This application claims priority of Chinese Application No. 202410167538.5, filed on Feb. 5, 2024, the entire contents of which are incorporated herein by reference.

TECHNICAL FIELD

The present disclosure relates to the field of fuel cell, and in particular, to a method and a system for optimizing a lifetime of a fuel cell system based on adjustment and constraint of a thermoelectric ratio.

BACKGROUND

A co-generation system (MW level) of a high-power fuel cell is usually composed of a plurality of fuel cell systems, and usually faces two issues during operation.

Due to inconsistency of performance of respective systems, performance attenuation is inconsistent after a period of operation. In extreme cases, a lifetime of a whole system is greatly reduced due to a fault of an individual system, which requires optimization.

Due to changes of demands of thermoelectric loads, it needs to adjust an electrothermal output ratio of the whole system, that is, a portion of systems need to generate more heat or require more electric efficiency. This dynamic response process may lead to the attenuation of the lifetime.

In the case of performance attenuation of a certain system or several systems, the related load is required to be adjusted in the case of dynamic thermoelectric output to ensure the lifetime and stability of the whole multi-machine fuel cell system.

SUMMARY

According to a first aspect of the present disclosure, the present disclosure requests to protect a method for optimizing a lifetime of a fuel cell system based on adjustment and constraint of a thermoelectric ratio, applied to a multi-machine fuel cell system comprising a plurality of single-machine fuel cell systems, comprising:
  obtaining an initial reference voltage of each of the single-machine fuel cell systems in the multi-machine fuel cell system under a normal operating condition, and performing a durability test on the single-machine fuel cell systems to obtain a variation relationship of reference voltage over time of each of the single-machine fuel cell systems;
  monitoring an operating voltage of each of the single-machine fuel cell systems during a real operation in real-time under the normal operating condition to obtain a real-time monitored voltage and a real-time voltage deviation of each of the single-machine fuel cell systems;
  calculating, according to the variation relationship of the reference voltage over time and the real-time monitored voltage of each of the single-machine fuel cell systems, a performance expected attenuation profile of each of the single-machine fuel cell systems under the normal operating condition;
  obtaining a performance expected attenuation profile and an available heat profile of each of the single-machine fuel cell systems when operating at each current density point, and calculating a health state boundary of each of the single-machine fuel cell systems in stable operation;
  optimizing an operating mode of each of the single-machine fuel cell systems by using the available heat profile, the performance expected attenuation profile, and the health state boundary of each of the single-machine fuel cell systems; wherein
  before obtaining the initial reference voltage of each of the single-machine fuel cell systems in the multi-machine fuel cell system under the normal operating condition, the method further comprises that:
  a variation spectrum of a condition of the multi-machine fuel cell system over time is expressed as follows:

$$Q_{output}=\Sigma f(C_i t_i, C_j Q_{rated}, C_k t_j, C_m Q_{rated}) \quad (1)$$

wherein $Q_{output}$ is output power of the multi-machine fuel cell system, $Q_{rated}$ is a rated power, $\Sigma$ is combination forms of addition and subtraction under operating states in different modes, which combine a complete operating condition, $f$ represents a function feature in different states, C represents an coefficient factor in the different states, which is equal to the output power in a certain state divided by the rated power, t represents different operating times, subscripts i, j, and k of t are applicable to different operating time ranges, and subscripts i, j, k, and m of C represent different values in different operating times the obtaining an initial reference voltage of each of the single-machine fuel cell systems in the multi-machine fuel cell system under a normal operating condition further includes that:
an initial voltage matrix of the plurality of single-machine fuel cell systems is expressed as:

$$V_{initial}=[V_1, V_2, V_3, V_4 \ldots] \quad (2)$$

wherein, $V_{initial}$ is an initial reference voltage of a fuel cell subsystem, $V_1$, $V_2$, $V_3$, and $V_4$ are the initial reference voltages of the single-machine fuel cell systems No. 1, No. 2, No. 3, No. 4 in a specified state;
if the initial reference voltage of each of the single-machine fuel cell systems is deviated from each other by a preset deviation value, the single-machine fuel cell systems needs to be replaced at an initial stage;
the performing a durability test on the single-machine fuel cell systems to obtain a variation relationship of reference voltage over time of each of the single-machine fuel cell systems further includes:
obtaining a corresponding fitting formula according to performance differences of different single-machine fuel cell systems;
using a fitting manner of subtracting the first from the last or a linear fitting manner in a fitting process, and a prediction voltage matrix $V_{pc}$ of the variation relationship of the reference voltage over time of the multi-machine fuel cell systems being expressed as:

$$V_{pc}=[M_1, M_2, M_3, M_4 \ldots] \quad (3)$$

wherein, 1, 2, 3, and 4 are numbers of the single-machine systems, and $M_1$, $M_2$, $M_3$, and $M_4$ are forms of the prediction voltage of the single-machine fuel cell systems No. 1, No. 2, No. 3, and No. 4—variation relationship of reference voltage over time;

the monitoring an operating voltage of each of the single-machine fuel cell systems during a real operation in real-time under the normal operating condition to obtain a real-time monitored voltage and a real-time voltage deviation of each of the single-machine fuel cell systems further includes that:

the real-time monitored voltage matrix $V_{rt}$ of the variation relationship of each of the single-machine fuel cell systems over operating time is:

$$V_{rt}=[V_{rt1}, V_{rt2}, V_{rt3}, V_{rt4} \ldots] \tag{4}$$

wherein, 1, 2, 3, and 4 are numbers of the single-machine systems;

correcting a prediction voltage matrix $V_{pcn}$ in a control policy in real-time according to a real-time voltage monitoring situation;

$$V_{pcn}=[M_1+\varepsilon_1 M_1, M_2+\varepsilon_2 M_2, M_3+\varepsilon_3 M_3, M_4+\varepsilon_4 M_4 \ldots] \tag{5}$$

$$\varepsilon_1 = \frac{V_{rt1} - M_1}{M_1}, \varepsilon_2 = \frac{V_{rt2} - M_2}{M_2}, \ldots \tag{6}$$

wherein, $\varepsilon$ is a correction coefficient;

obtaining a real-time voltage deviation matrix $\eta_{rt}$ between each of the single-machine fuel cell systems;

$$\eta_{rt} = [\eta_1, \eta_2, \eta_3, \eta_4 \ldots] \tag{7}$$

$$\eta_1 = \frac{\text{Max}[V_{rt1}, V_{rt2}, V_{rt3}, V_{rt4} \ldots] - V_{rt1}}{\text{Max}[V_{rt1}, V_{rt2}, V_{rt3}, V_{rt4} \ldots]} \times 100\%$$

$$\eta_2 = \frac{\text{Max}[V_{rt1}, V_{rt2}, V_{rt3}, V_{rt4} \ldots] - V_{rt2}}{\text{Max}[V_{rt1}, V_{rt2}, V_{rt3}, V_{rt4} \ldots]} \times 100\%$$

wherein, $\eta$ is a deviation percentage;

the calculating, according to the variation relationship of the reference voltage over time and the real-time monitored voltage of each of the single-machine fuel cell systems, a performance expected attenuation profile of each of the single-machine fuel cell systems under the normal operating condition further includes:

obtaining a prediction voltage deviation matrix $\eta_{prt}$ between each of the single-machine fuel cell systems according to a prediction voltage matrix $V_{pc}$ of the variation relationship of the reference voltage over time of each of the single-machine fuel cell systems and a real-time corrected prediction voltage matrix $V_{pcn}$ as the performance expected attenuation profile of each of the single-machine fuel cell systems under the normal operating condition;

$$\eta_{prt} = [\eta_{p1}, \eta_{p2}, \eta_{p3}, \eta_{p4} \ldots] \tag{8}$$

$$\eta_{p1} = \frac{\text{Max}[M_1+\varepsilon_1 M_1, M_2+\varepsilon_2 M_2, M_3+\varepsilon_3 M_3, M_4+\varepsilon_4 M_4 \ldots] - (M_1+\varepsilon_1 M_1)}{\text{Max}[M_1+\varepsilon_1 M_1, M_2+\varepsilon_2 M_2, M_3+\varepsilon_3 M_3, M_4+\varepsilon_4 M_4 \ldots]} \times 100\%$$

$$\eta_{p2} = \frac{\text{Max}[M_1+\varepsilon_1 M_1, M_2+\varepsilon_2 M_2, M_3+\varepsilon_3 M_3, M_4+\varepsilon_4 M_4 \ldots] - (M_2+\varepsilon_2 M_2)}{\text{Max}[M_1+\varepsilon_1 M_1, M_2+\varepsilon_2 M_2, M_3+\varepsilon_3 M_3, M_4+\varepsilon_4 M_4 \ldots]} \times 100\%$$

calculating an expected performance attenuation rate matrix $\varphi_{prt}$ of each of the single-machine fuel cell systems:

$$\varphi_{prt} = [\varphi_{p1}, \varphi_{p2}, \varphi_{p3}, \varphi_{p4} \ldots] \tag{9}$$

$$\varphi_{p1} = \frac{V_1 - M_1}{V_1}$$

$$\varphi_{p2} = \frac{V_2 - M_2}{V_2}$$

wherein the expected performance attenuation rate deviation matrix $\delta_{prt}$ of each of the single-machine fuel cell systems is calculated:

$$\delta_{prt} = [\delta_{p1}, \delta_{p2}, \delta_{p3}, \delta_{p4} \ldots] \tag{10}$$

$$\delta_{p1} = \frac{\text{Max}[\varphi_{p1}, \varphi_{p2}, \varphi_{p3}, \varphi_{p4} \ldots] - \varphi_{p1}}{\text{Max}[\varphi_{p1}, \varphi_{p2}, \varphi_{p3}, \varphi_{p4} \ldots]}$$

$$\delta_{p2} = \frac{\text{Max}[\varphi_{p1}, \varphi_{p2}, \varphi_{p3}, \varphi_{p4} \ldots] - \varphi_{p2}}{\text{Max}[\varphi_{p1}, \varphi_{p2}, \varphi_{p3}, \varphi_{p4} \ldots]} \times 100\%$$

wherein formula (8) represents performance deviation between each of the single-machine fuel cell systems; formula (10) represents expected performance attenuation rate deviation between each of the single-machine fuel cell systems;

the obtaining a performance expected attenuation profile and an available heat profile of each of the single-machine fuel cell systems when operating at each current density point, and calculating a health state boundary of each of the single-machine fuel cell systems in stable operation further includes that:

heat generation Q is shown in formula (11) and output power P is shown in formula (12):

$$Q=Q_r+Q_c \tag{11}$$

wherein $Q_r$ represents reaction heat generation, $Q_c$ represents ohmic heat, and both are related to a current density during operation;

$$P=V_{rt}I \tag{12}$$

wherein I represents the current during the operation, which is equal to a current density multiplied by an active area, and the active area is a known design parameter;

obtaining a prediction voltage matrix $V_{pci}$ of the variation relationship of the reference voltage over time under different current densities at an interval of every 0.2 A/cm$^2$ when each of the single-machine fuel cell systems operates at a preset current density range:

$$V_{pci-0.8} = [N_1, N_2, N_3, N_4 \ldots] \tag{13}$$

$$V_{pci-1.0} = [S_1, S_2, S_3, S_4 \ldots]$$

$$V_{pci-1.2} = [G_1, G_2, G_3, G_4 \ldots]$$

wherein N, S, and G have the same meaning as M in formula (3), and if the prediction voltage matrix M of the single-machine fuel cell system with a certain number is adjusted to a form in N, S, and G, corresponding calculation is replaced in formula (9);

0.8, 1.0, and 1.2 are current density values, in units of A/cm$^2$;

a relationship matrix $Q_p$ between actual available heat and the current density are obtained by using formula (14):

$$Q_p = [Q_{p0.8}, Q_{p1.0}, Q_{1.2}, Q_{p1.4}, Q_{p1.6}, Q_{p1.8}] \quad (14)$$

$$Q_{p0.8} = cm_{0.8}\Delta T_{0.8}$$

$$Q_{p1.0} = cm_{1.0}\Delta T_{1.0}$$

wherein c represents a heat capacity of coolant, which is a known amount determined according to a type of the coolant, m represents a coolant flow rate, which is a known amount read by a flow meter, $\Delta T$ is a temperature difference of the coolant at inlet and outlet of the single-machine fuel cell system, which is a known amount read by temperature sensors at the inlet and the outlet, 0.8, 1.0, and 1.2 are the current density values, in units of A/cm$^2$;

by using formula (15), an available heat $Q_u$ in the normal operating condition is obtained:

$$Q_u = cm_u \Delta T_u \quad (15)$$

formula (15) is applicable to all the single-machine fuel cell systems before adjustment, $m_u$ represents a coolant flow rate under the normal operating condition, and $\Delta T_u$ represents a temperature difference of the coolant at the inlet and outlet of the system under the normal operating condition;

after operating conditions of a portion of the single-machine fuel cell systems are adjusted by using formula (13) and formula (14), a total heat output obtained by summing each of the single-machine fuel cell systems is consistent with the total available heat $Q_u$ during normal operation before the adjustment;

the optimizing an operating mode of each of the single-machine fuel cell systems by using the available heat profile, the performance expected attenuation profile, and the health state boundary of each of the single-machine fuel cell systems further includes:

adjusting the operating mode of each of the single-machine fuel cell systems by using the prediction voltage deviation matrix between each of the single-machine fuel cell systems and the expected performance attenuation rate deviation matrix of each of the single-machine fuel cell systems, wherein a relationship matrix between the actual available heat and the current density is used as a constraint condition to obtain a heat output;

if the voltage deviation in the real-time voltage deviation matrix between each of the single-machine fuel cell systems is not less than a first preset value when each of the single-machine fuel cell systems is in stable operation, performing an adjustment;

the optimizing an operating mode of each of the single-machine fuel cell systems by using the performance expected attenuation profile and the health state boundary of each of the single-machine fuel cell systems further includes:

if the performance of a portion of the single-machine fuel cell systems is degraded, using a hybrid operating mode including that:

the portion of the single-machine fuel cell systems whose performance is degraded operates in an operating condition with a low attenuation rate calculated by the formula (13), if total output power or heat is insufficient, one or more single-machine fuel cell systems with a minimum attenuation calculated by the formula (8) operate in an operating condition with a high current density in formula (13);

combined total power and heat output values of the operating current and output voltage required by all the single-machine fuel cell systems are calculated by using the formulas (12), (14), and (15)

According to a second aspect of the present disclosure, the present disclosure requests to protect a system for optimizing a lifetime of a fuel cell based on adjustment and constraint of a thermoelectric ratio, comprising:

one or more processors;

a memory storing one or more programs, when the one or more programs are executed by the one or more processors, the one or more processors perform the method for optimizing a lifetime of a fuel cell based on adjustment and constraint of a thermoelectric ratio.

DETAILED DESCRIPTION

Figure 1:
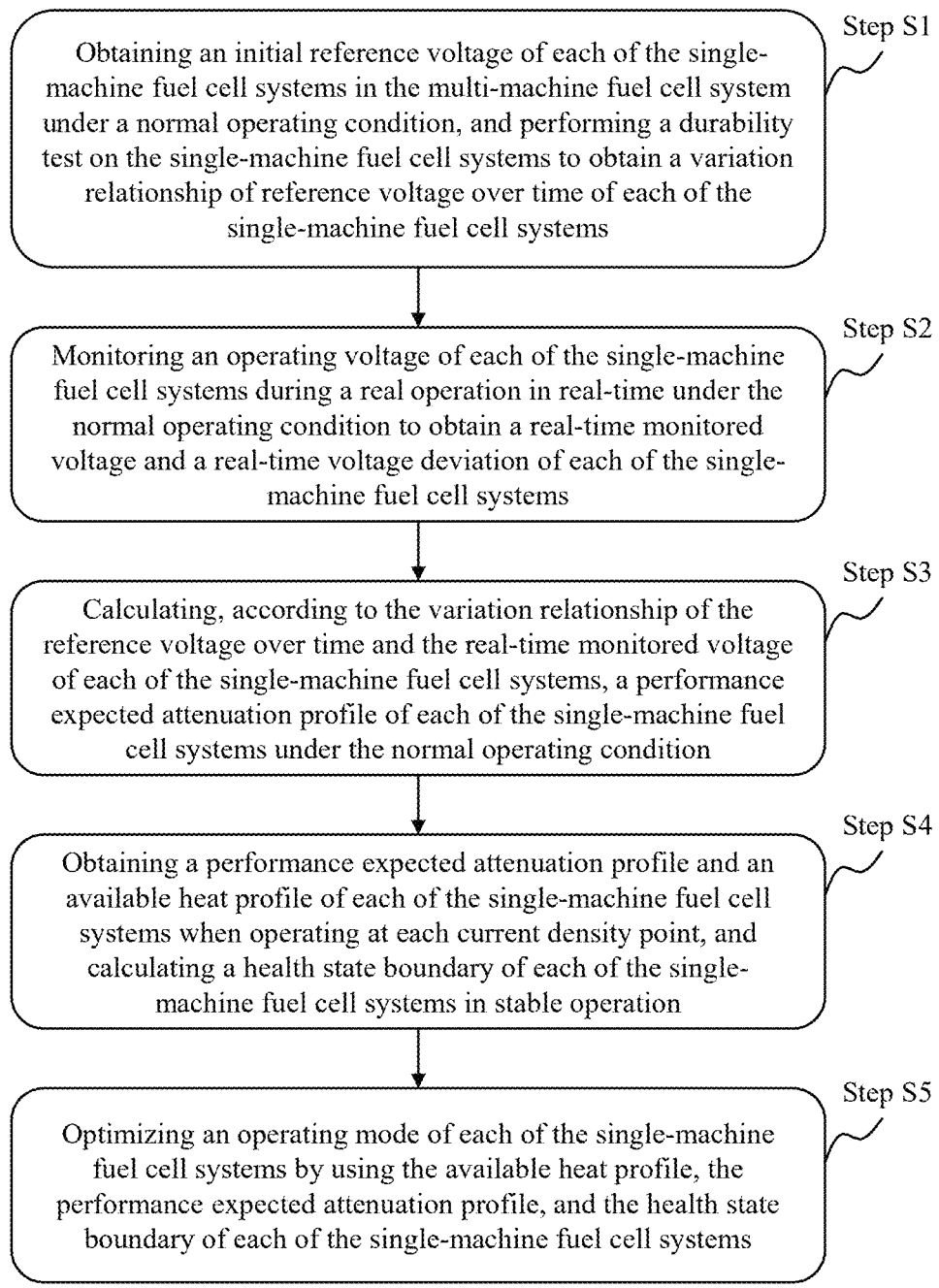
FIG. 1 is an exemplary flowchart of a method for optimizing a lifetime of a fuel cell system based on adjustment and constraint of a thermoelectric ratio according to an embodiment of the present disclosure.

According to a first embodiment of the present disclosure, referring to FIG. 1, FIG. 1 is an exemplary flowchart of a method for optimizing a lifetime of a fuel cell system based on adjustment and constraint of a thermoelectric ratio according to an embodiment of the present disclosure. The present disclosure requests to protect a method for optimizing a lifetime of a fuel cell system based on adjustment and constraint of a thermoelectric ratio, and the method is applied to a multi-machine fuel cell system including a plurality of single-machine fuel cell systems and is executed by a processor, which may include a central processing unit (CPU), a specialized integrated circuit (ASIC), etc. The flowchart of a method for optimizing a lifetime of a fuel cell system based on adjustment and constraint of a thermoelectric ratio may include following steps.

Step S1: obtaining an initial reference voltage of each of the single-machine fuel cell systems in the multi-machine fuel cell system under a normal operating condition, and performing a durability test on the single-machine fuel cell systems to obtain a variation relationship of reference voltage over time of each of the single-machine fuel cell systems.

The normal operating condition means a state of normal operation of a multi-machine fuel cell system.

The fuel cell system (which may be referred to as a system) includes a multi-machine fuel cell system and a plurality of single-machine fuel cell systems.

The multi-machine fuel cell system (also referred to as a co-generation system of a multi-machine fuel cell) is a system consisting of a plurality of single-machine fuel cell systems connected in series or in parallel to provide higher power output and/or longer operation time.

The single-machine fuel cell system (also referred to as a single-machine system or a fuel cell subsystem) means a stand-alone fuel cell unit capable of converting chemical energy directly into electrical energy.

The initial reference voltage (also referred to as an initial reference voltage value) refers to a voltage of a single-machine fuel cell system that has just been started and has not been operated for a long period of time, and is obtained by a sensor.

The reference voltage is a voltage of the single-machine fuel cell system at any point in time and is obtained by the sensor.

Step S2: monitoring an operating voltage of each of the single-machine fuel cell systems during a real operation in real-time under the normal operating condition to obtain a real-time monitored voltage and a real-time voltage deviation of each of the single-machine fuel cell systems.

The real-time voltage deviation is a difference between the actual monitored voltage (e.g., an operating voltage) and the reference voltage.

Step S3: calculating, according to the variation relationship of the reference voltage over time and the real-time monitored voltage of each of the single-machine fuel cell systems, a performance expected attenuation profile of each of the single-machine fuel cell systems under the normal operating condition.

The performance expected attenuation profile is an extent to which the performance of the single-machine fuel cell system declines over time during normal operation.

In some embodiments, the processor determines the performance expected attenuation profile of each of the single-machine fuel cell system by means of formula (8) based on the variation relationship of reference voltage over time and the real-time monitored voltages of each of the single-machine fuel cell systems. More about formula (8) can be found in the related description later in FIG. 1.

Step S4: obtaining a performance expected attenuation profile and an available heat profile of each of the single-machine fuel cell systems when operating at each current density point, and calculating a health state boundary of each of the single-machine fuel cell systems in stable operation.

The health state boundary includes, for example, an indicator of selecting an operating mode of the single-machine fuel cell system to ensure that the performance attenuation of the single-machine fuel cell system is within a predefined range.

The available heat profile includes heat that can be generated by the single-machine fuel cell system during operation, etc.

In some embodiments, the processor may obtain, based on formulas (11)-(15), the performance expected attenuation profile and available heat profile of each of single-machine fuel cell systems when operating at each current density point, so as to calculate the health state boundary of each of the single-machine fuel cell systems in stable operation. More about formulas (11)-(15) can be found in the related description later in FIG. 1.

Step S5: optimizing an operating mode of each of the single-machine fuel cell systems by using the available heat profile, the performance expected attenuation profile, and the health state boundary of each of the single-machine fuel cell systems.

In some embodiments, in response to the performance expected attenuation being faster, the processor adjusts operating modes, such as adjusting an operating current, an output voltage, or the like, in conjunction with the health state boundary and available heat profile, so as to optimize. More about this embodiment can be found in the related description later in FIG. 1.

The operating current and the output voltage may be obtained by a sensor.

In some embodiments, in step S1, before obtaining the initial reference voltage of each of the single-machine fuel cell systems in the multi-machine fuel cell system under the normal operating condition, the method further includes the follows.

A variation spectrum of a condition of the multi-machine fuel cell system over time is expressed as follows:

$$Q_{output} = \Sigma f(C_i t_i, C_j Q_{rated}, C_k t_j, C_m Q_{rated}) \qquad (1)$$

where $Q_{output}$ is output power of the multi-machine fuel cell system, $Q_{rated}$ is a rated power, $\Sigma$ is combination forms of addition and subtraction under operating states in different modes (also referred to different states), which combine a complete operating condition, $f$ represents a function feature in different states, $C$ represents an coefficient factor in different states, which is equal to the output power in a certain state divided by the rated power, $t$ represents different operating times, subscripts i, j, and k of t are applicable to different operating time ranges, and subscripts i, j, k and m of C represent different values in different operating times.

The rated power is the maximum output power of the multi-machine fuel cell system, which is determined by professional technicians through experiments.

Figure 2:
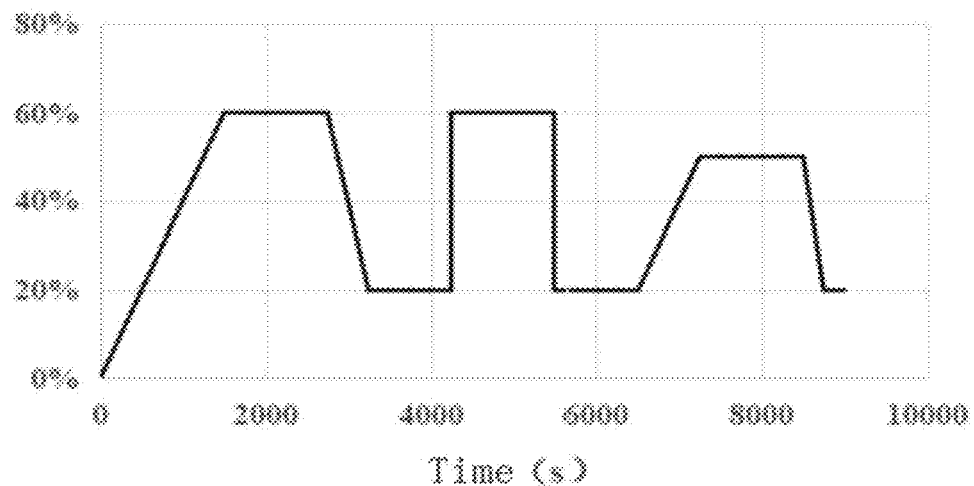
FIG. 2 is a schematic diagram of operating power of a multi-machine fuel cell system in a method for optimizing a lifetime of a fuel cell system based on adjustment and constraint of a thermoelectric ratio according to an embodiment of the present disclosure.

In this embodiment, the operating condition of the multi-machine fuel cell system is adjusted according to a desired electrothermal requirement. However, for a longer lifetime of the multi-machine fuel cell system, an operating adjustment frequency is generally relatively slow, and is measured in hours. Therefore, the operating condition is set relatively moderately. However, a process of setting the operating condition needs to conform to an actual application scenario. Considering a variable load frequency, compared with a triangular wave operating condition, a square wave or a trapezoidal wave operating condition is more consistent, as shown in FIG. 2.

In some embodiments, in step S1, obtaining the initial reference voltage of each of the single-machine fuel cell systems in the multi-machine fuel cell system under the normal operating condition includes the follows.

An initial voltage matrix of the plurality of single-machine fuel cell systems is expressed as:

$$V_{initial}=[V_1,V_2,V_3,V_4 \ldots] \quad (2)$$

where $V_{initial}$ is an initial reference voltage of a fuel cell subsystem, $V_1$, $V_2$, $V_3$, and $V_4$ are initial reference voltages of single-machine fuel cell systems No. 1, No. 2, No. 3, No. 4 in a specified state.

If the initial reference voltage of the single-machine fuel cell system is deviated from each other by a preset deviation value, the single-machine fuel cell system needs to be replaced at an initial stage. The initial stage is a stage when the single-machine fuel cell system has just been started or activated. The preset deviation value may be set by default by a specialized technician.

In some embodiments, in step S1, performing the durability test on the single-machine fuel cell systems to obtain the variation relationship of reference voltage over time of each of the single-machine fuel cell systems includes:

obtaining a corresponding fitting formula according to performance differences of different single-machine fuel cell systems.

In a fitting process, a fitting manner of subtracting the first from the last or a linear fitting manner (e.g., a least square manner, etc.) is used, and a prediction voltage matrix $V_{pc}$ of variation relationship of reference voltage over time of the multi-machine fuel cell systems is:

$$V_{pc}=[M_1,M_2,M_3,M_4 \ldots] \quad (3)$$

where 1, 2, 3, and 4 are numbers of the single-machine fuel cell systems, and $M_1$, $M_2$, $M_3$, and $M_4$ are forms of the prediction voltage of single-machine fuel cell systems No. 1, No. 2, No. 3, and No. 4—variation relationship of reference voltage over time.

FIG. 2 is a schematic diagram of operating power of a multi-machine fuel cell system in a method for optimizing a lifetime of a fuel cell system based on adjustment and constraint of a thermoelectric ratio according to an embodiment of the present disclosure. The horizontal coordinate is the time(s) and the vertical coordinate is a percentage of the rated power. In this embodiment, another single-machine fuel cell system in the same batch is extracted in advance according to an operating condition shown in FIG. 2 to perform a durability groping test, so as to obtain a variation relationship M of reference voltage over time, which is used as an input condition of the multi-machine fuel cell system.

Figure 3:
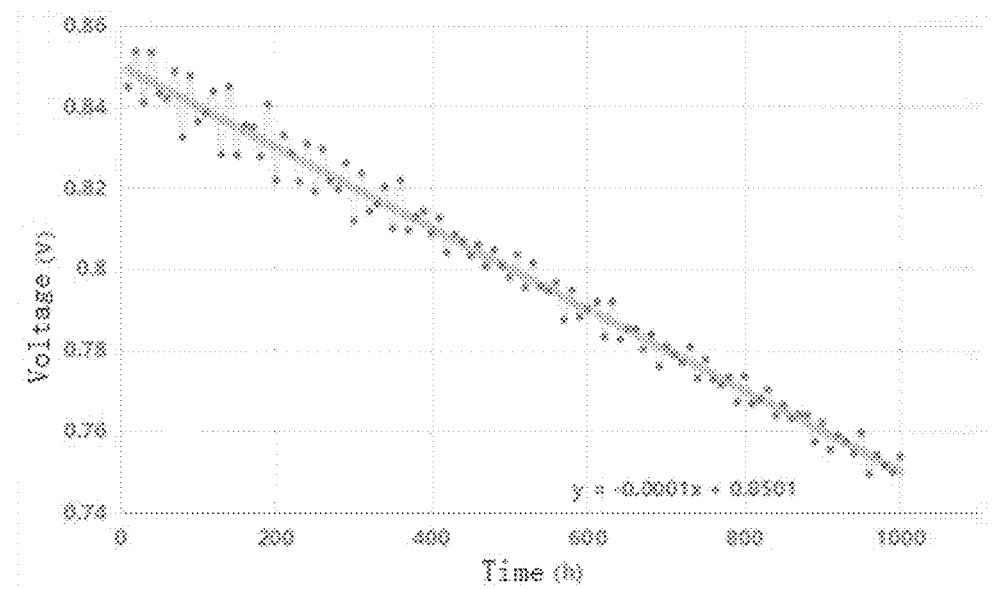
FIG. 3 is a schematic diagram of a first attenuation of a fuel cell system voltage over operating time in a method for optimizing a lifetime of a fuel cell system based on adjustment and constraint of a thermoelectric ratio according to an embodiment of the present disclosure.

FIG. 3 is a schematic diagram of a first attenuation of a fuel cell system voltage over operating time in a method for optimizing a lifetime of a fuel cell system based on adjustment and constraint of a thermoelectric ratio according to an embodiment of the present disclosure. The horizontal coordinate is the time (h) and the vertical coordinate is the voltage (V). As shown in FIG. 3, M=−0.0001t+0.8501. The fitting formula is also different according to difference in performances of different single-machine fuel cell systems. M is forms of the prediction voltage of the single-machine fuel cell systems—variation relationship of reference voltage over time, and t is time.

In some embodiments, in step S2, the method further includes following.

The real-time monitored voltage matrix $V_{rt}$ of the variation relationship of each of the single-machine fuel cell systems over operating time is:

$$V_{rt}=[V_{rt1},V_{rt2},V_{rt3},V_{rt4} \ldots] \quad (4)$$

where 1, 2, 3, and 4 are numbers of each of the single-machine fuel cell systems.

The processor corrects the prediction voltage matrix $V_{pcn}$ in a control policy in real-time according to the real-time voltage monitoring situation.

$$V_{pcn}=[M_1+\varepsilon_1 M_1, M_2+\varepsilon_2 M_2, M_3+\varepsilon_3 M_3, M_4+\varepsilon_4 M_4 \ldots] \quad (5)$$

$$\varepsilon_1 = \frac{V_{rt1} - M_1}{M_1}, \varepsilon_2 = \frac{V_{rt2} - M_2}{M_2} \quad (6)$$

where $\varepsilon$ is a correction coefficient.

The processor obtains a real-time voltage deviation matrix $\eta_{rt}$ between each of the single-machine fuel cell systems:

$$\eta_{rt} = [\eta_1, \eta_2, \eta_3, \eta_4 \ldots] \quad (7)$$

$$\eta_1 = \frac{\text{Max}[V_{rt1}, V_{rt2}, V_{rt3}, V_{rt4}\ldots] - V_{rt1}}{\text{Max}[V_{rt1}, V_{rt2}, V_{rt3}, V_{rt4}\ldots]} \times 100\%$$

$$\eta_2 = \frac{\text{Max}[V_{rt1}, V_{rt2}, V_{rt3}, V_{rt4}\ldots] - V_{rt2}}{\text{Max}[V_{rt1}, V_{rt2}, V_{rt3}, V_{rt4}\ldots]} \times 100\%$$

where, $\eta$ is a deviation percentage.

Figure 4:
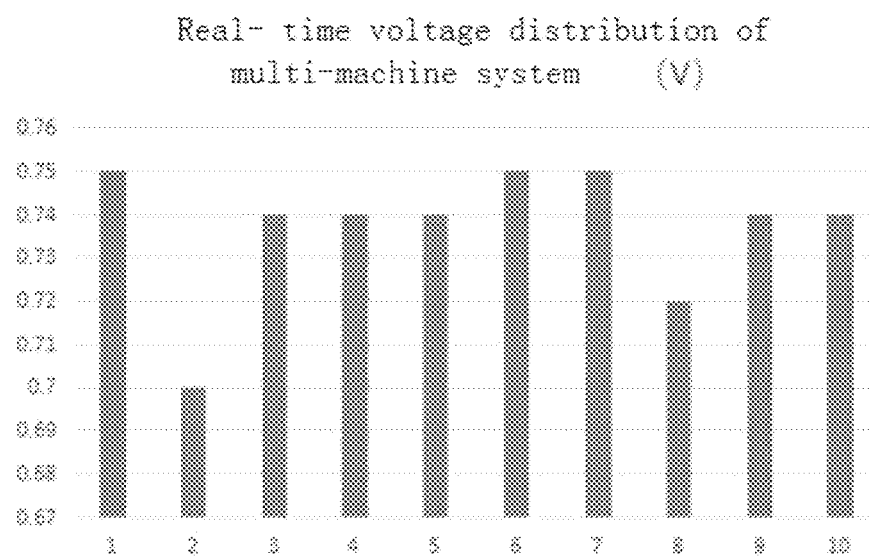
FIG. 4 is a real-time distribution diagram of voltages of a multi-machine fuel cell system in a method for optimizing a lifetime of a fuel cell system based on adjustment and constraint of a thermoelectric ratio according to an embodiment of the present disclosure.

In this embodiment, referring to FIG. 4, it shows the distribution of real-time monitored voltages of the multi-machine fuel cell system. The horizontal coordinate is the number of the single-machine fuel cell system and the vertical coordinate is the performance of the single-machine fuel cell system. After operating for a period of time, the performances of fuel cell systems No. 2 and No. 8 decrease obviously, which indicates that No. 2 and No. 8 are two single-machine fuel cell systems whose performance consistency in the multi-machine fuel cell system is relatively poor, and the rest single-machine fuel cell systems exhibit relatively high performance consistency. Therefore, the control strategy should be adjusted as soon as possible, and energy management strategies for No. 2 and No. 8 should be implemented in advance to ensure long-term and healthy operation of the multi-machine fuel cell system.

In some embodiments, in step S3, the method further includes:

obtaining a prediction voltage deviation matrix $\eta_{prt}$ between each of the single-machine fuel cell systems according to a prediction voltage matrix $V_{pc}$ of the variation relationship of the reference voltage over time of each of the single-machine fuel cell systems and a real-time corrected prediction voltage matrix $V_{pcn}$ as the performance expected attenuation profile of each of the single-machine fuel cell systems under the normal operating condition $$\eta_{prt} = [\eta_{p1}, \eta_{p2}, \eta_{p3}, \eta_{p4}\ldots] \quad (8)$$

$$\eta_{p1} = \frac{\text{Max}[M_1 + \eta_1 M_1, M_2 + \eta_2 M_2, M_3 + \eta_3 M_3, M_4 + \eta_4 M_4\ldots] - (M_1 + \eta_1 M_1)}{\text{Max}[M_1 + \eta_1 M_1, M_2 + \eta_2 M_2, M_3 + \eta_3 M_3, M_4 + \eta_4 M_4\ldots]} \times 100\%$$

$$\eta_{p2} = \frac{\text{Max}[M_1 + \eta_1 M_1, M_2 + \eta_2 M_2, M_3 + \eta_3 M_3, M_4 + \eta_4 M_4 \ldots] - (M_2 + \eta_2 M_2)}{\text{Max}[M_1 + \eta_1 M_1, M_2 + \eta_2 M_2, M_3 + \eta_3 M_3, M_4 + \eta_4 M_4 \ldots]} \times 100\%$$

...

calculating an expected performance attenuation rate matrix $\varphi_{prt}$ of each of the single-machine fuel cell systems:

$$\varphi_{prt} = [\varphi_{p1}, \varphi_{p2}, \varphi_3, \varphi_4 \ldots] \quad (9)$$

$$\varphi_{p1} = \frac{V_1 - M_1}{V_1}$$

$$\varphi_{p2} = \frac{V_2 - M_2}{V_2}$$

...

Therefore, the expected performance attenuation rate deviation matrix $\delta_{prt}$ of each of the single-machine fuel cell systems is calculated as:

$$\delta_{prt} = [\delta_{p1}, \delta_{p2}, \delta_{p3}, \delta_{p4} \ldots] \quad (10)$$

$$\delta_{p1} = \frac{\text{Max}[\varphi_{p1}, \varphi_{p2}, \varphi_{p3}, \varphi_{p4} \ldots] - \varphi_{p1}}{\text{Max}[\varphi_{p1}, \varphi_{p2}, \varphi_{p3}, \varphi_{p4} \ldots]} \times 100\%$$

$$\delta_{p2} = \frac{\text{Max}[\varphi_{p1}, \varphi_{p2}, \varphi_{p3}, \varphi_{p4} \ldots] - \varphi_{p2}}{\text{Max}[\varphi_{p1}, \varphi_{p2}, \varphi_{p3}, \varphi_{p4} \ldots]} \times 100\%$$

...

Formula (8) represents the performance deviation between each of the single-machine fuel cell systems. Formula (10) represents the deviation of attenuation rate (also referred to expected performance attenuation rate) between each of the single-machine fuel cell systems.

In this embodiment, the performance deviation among each of the single-machine fuel cell systems cannot be excessively large, and a large expected performance attenuation rate cannot occur in a certain single-machine fuel cell system during adjustment.

In some embodiments, in step S4, the method further includes following.

Heat generation Q is shown in formula (11) and the output power P is shown in formula (12):

$$Q = Q_r + Q_c \quad (11)$$

where $Q_r$ represents reaction heat generation, $Q_c$ represents ohmic heat, and both are related to a current density during operation.

$$P = V_{rt} I \quad (12)$$

where I represents a current during operation, which is equal to a current density multiplied by an active area, and the active area is a known design parameter.

Other single-machine fuel cell systems in the same batch are extracted in advance, so as to obtain a prediction voltage matrix $V_{pci}$ of the variation relationship of the reference voltage over time under different current densities at an interval of every 0.2 A/cm² when each of the single-machine fuel cell systems operates at a preset current density range.

$$V_{pci-0.8} = [N_1, N_2, N_3, N_4 \ldots] \quad (13)$$

$$V_{pci-1.0} = [S_1, S_2, S_3, S_4 \ldots]$$

$$V_{pci-1.2} = [G_1, G_2, G_3, G_4 \ldots]$$

...

where N, S, and G have the same meaning as M in formula (3), and if the prediction voltage matrix M of a single-machine system with a certain number is adjusted to a form in N, S, and G, corresponding calculation is replaced in formula (9).

0.8, 1.0, and 1.2 are current density values, in units of A/cm2. The current density is an amount of current flowing per unit area of an electrode surface of the single-machine fuel cell system.

In addition to obtaining the formula (13), a relationship matrix $Q_p$ between actual available heat and current density may be obtained by using the formula (14):

$$Q_p = [Q_{p0.8}, Q_{p1.0}, Q_{p1.2}, Q_{p1.4}, Q_{p1.6}, Q_{p1.8} \ldots] \quad (14)$$

$$Q_{p0.8} = cm_{0.8} \Delta T_{0.8}$$

$$Q_{p1.0} = cm_{1.0} \Delta T_{1.0}$$

...

where c represents a heat capacity of coolant, which is a known amount determined according to a type of the coolant, m represents a coolant flow rate, which is a known amount read by a flow meter, $\Delta T$ is a temperature difference of the coolant at inlet and outlet of the single-machine fuel cell system, which is a known amount read by temperature sensors at the inlet and the outlet, 0.8, 1.0, and 1.2 are the current density values, in units of A/cm².

By using formula (15), the available heat $Q_u$ in normal operating conditions is obtained.

$$Q_u = cm_u \Delta T_u \quad (15)$$

Formula (15) is applicable to all single-machine fuel cell systems before adjustment. $m_u$ represents a coolant flow rate under the normal operating condition, and $\Delta T_u$ represents a temperature difference between the coolant at the inlet and outlet of the single-machine fuel cell system under the normal operating condition.

After operating conditions of a portion of the single-machine fuel cell systems are adjusted by using formula (13) and formula (14), a total heat output obtained by summing each of the single-machine fuel cell systems is consistent with the total available heat $Q_u$ during normal operation before the adjustment.

In this embodiment, heat generation of the fuel cell mainly includes two parts: reaction heat and ohmic heat. The heat generation is closely related to the current density. The higher the current density in a selection interval, the greater the heat generation of the fuel cell.

Figure 5:
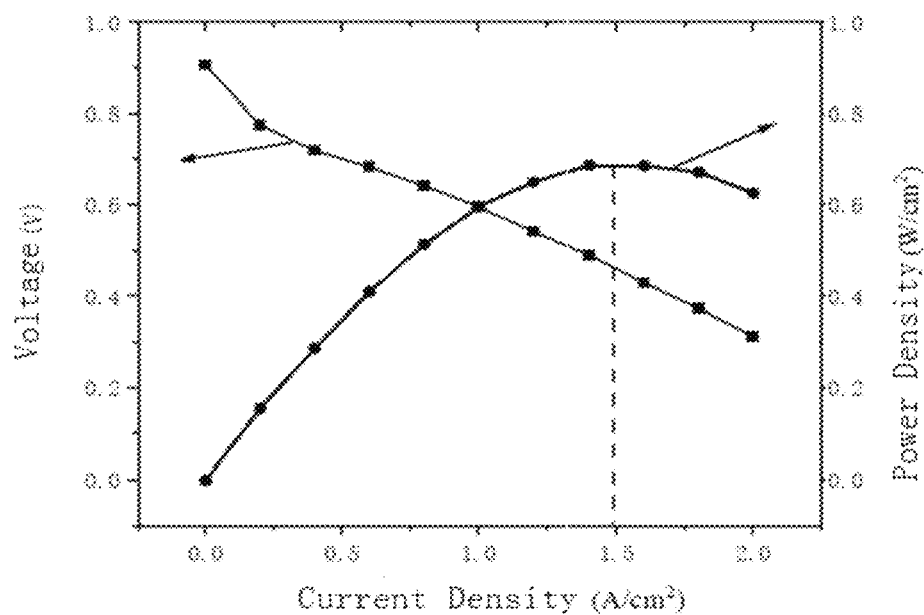
FIG. 5 is a polarization curve and a power density diagram of a single-machine fuel cell system of a method for optimizing a lifetime of a fuel cell system based on adjustment and constraint of a thermoelectric ratio according to an embodiment of the present disclosure.

The heat production Q is positively correlated with the current density, so the higher the current density, the higher the heat generation. FIG. 5 is a polarization curve and a power density diagram of a single-machine fuel cell system of a method for optimizing a lifetime of a fuel cell system based on adjustment and constraint of a thermoelectric ratio according to an embodiment of the present disclosure.

Horizontal coordinate is current density (A/cm²), and vertical coordinate is voltage (V) and power density (W/cm²). It may be found from FIG. 5 that a curve of a power density first increases to a peak value and then decreases (on the left and right sides of the dotted line in FIG. 5). Therefore, under the same input power, two different current densities may be corresponding to the left and right sides of the peak power, that is, two operating modes may be selected for the same power output. When operating on the right side of the peak power, the single-machine fuel cell system operates at a high current density, and the heat production is relatively large. When operating on the left side of the peak power, the current density of the single-machine fuel cell system is relatively low, and the heat production is relatively low, and a corresponding voltage in FIG. 5 is also relatively high. However, in this case, efficiency of the single-machine fuel cell system is relatively high (the efficiency is equal to a real-time voltage (also referred to real-time monitored voltage) divided by a theoretical voltage, and the theoretical voltage is known, such as 1.23 V). Therefore, the overall thermoelectric output target can be achieved by adjusting the output voltage and heat output of a portion of single-machine fuel cell systems.

However, the lifetime of the multi-machine fuel cell system is different in different operation states. When operating at low current density, i.e. high voltage, the life of the multi-machine fuel cell system is adversely affected (corrosion is aggravated); when operating at high current density, the water and heat management difficulty of the multi-machine fuel cell system increases, which is also likely to have an adverse effect on the life of the multi-fuel cell system (flooding, gas shortage, etc.). In addition, during variable load operation according to FIG. 2, the lifetime of the multi-machine fuel cell system is also adversely affected (diversified current density due to diversified operation power). The optimal operation state is that the multi-machine fuel cell system operates stably in a relatively proper condition.

In some embodiments, in step S5, the method further includes:

adjusting the operating mode of each of the single-machine fuel cell systems by using the prediction voltage deviation matrix between each of the single-machine fuel cell systems and the expected performance attenuation rate deviation matrix of each of the single-machine fuel cell systems, wherein a relationship matrix between the actual available heat and the current density is used as a constraint condition to obtain a heat output; and if the voltage deviation in the real-time voltage deviation matrix between each of the single-machine fuel cell systems is not less than a first preset value when each of the single-machine fuel cell systems is in stable operation, performing an adjustment.

Figure 6:
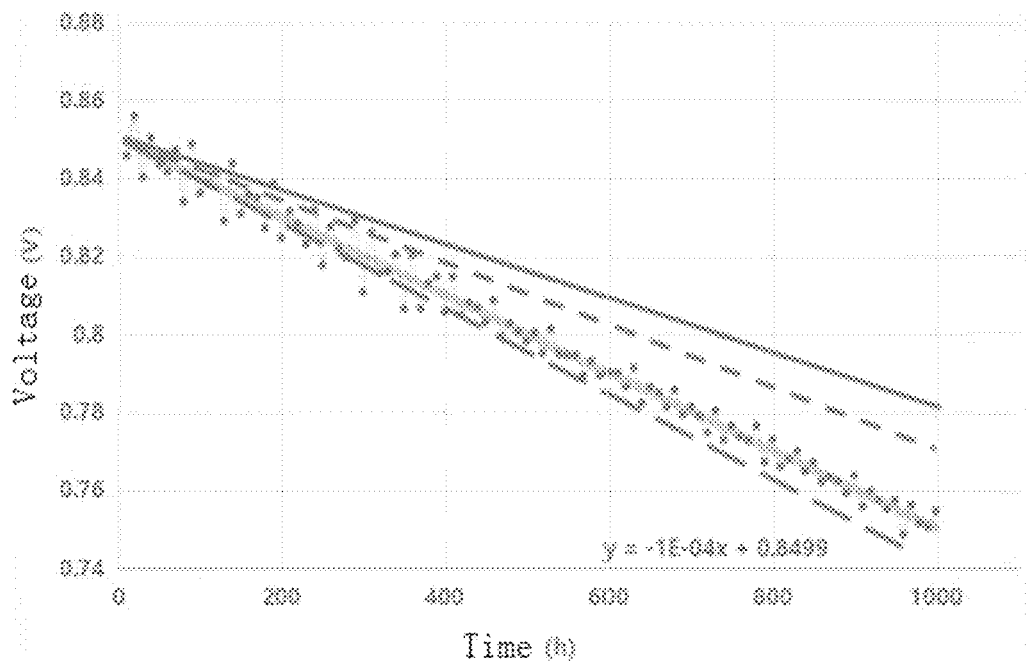
FIG. 6 is a schematic diagram of a second attenuation of a fuel cell system voltage over operating time in a method for optimizing a lifetime of a fuel cell system based on adjustment and constraint of a thermoelectric ratio according to an embodiment of the present disclosure.

In this embodiment, it may be learned from the foregoing analysis that the lifetime of the multi-machine fuel cell system is different in different operation states. Because of the linear fitting, by using a slope or drawing in the same diagram, it can be clearly understood that there are some operating conditions in the formula (13) that are better than the formula (3) and worse than the formula (3), as shown in FIG. 6. FIG. 6 is a schematic diagram of a second attenuation of a fuel cell system voltage over operating time in a method for optimizing a lifetime of a fuel cell system based on adjustment and constraint of a thermoelectric ratio according to an embodiment of the present disclosure. Horizontal coordinate is time (h), and vertical coordinate is voltage (V). FIG. 6 shows three more lines than FIG. 3. It shows two dotted lines, one of which is better than the formulas (3), while the other is worse than formula (3). The uppermost solid line is superior to the formula (3). That is, conditions with different attenuation performance exist in the formula (13) for the prediction voltage matrix.

In some embodiments, in step S5, the method further includes:

if the performance of a portion of the single-machine fuel cell systems is degraded, using a hybrid operating mode including that: the portion of the single-machine fuel cell systems whose performance is degraded operates in an operating condition with a low attenuation rate calculated by the formula (13), if total output power or heat is insufficient, one or more single-machine fuel cell systems with a minimum attenuation calculated by the formula (8) operate in an operating condition with a high current density in formula (13); combined total power and heat output values of the operating current and output voltage required by all the single-machine fuel cell systems are calculated by using the formulas (12), (14), and (15).

In some embodiments, the S5 further includes:

if the performance of a portion of the single-machine fuel cell systems is degraded, using a hybrid operating mode to control each of the single-machine fuel cell system to operate based on the hybrid operating mode including: controlling the portion of the single-machine fuel cell systems with the performance degradation to operate based on an operating condition with a low expected performance attenuation rate calculated in formula (13), including: determining, based on formula (13), control parameters for controlling at least one power controller of the portion of the single-machine fuel cell systems with the performance degradation, controlling each single-machine fuel cell system to operate based on the control parameters. At the same time, if the total output power or heat is insufficient, one or more of the single-machine fuel cell systems with the least degradation are obtained by the calculation of formula (8), and operate based on the operating condition with high current density in formula (13), including: determining, based on formula (13), the control parameters for controlling at least one of the power controllers for one or more of the single-machine fuel cell systems with the least degradation, and controlling, based on the control parameter, the operation of each single-machine fuel cell system. The combined total power and heat output values of the operating current and output voltage required by all the single-machine fuel cell systems are calculated by using the formulas (12), (14), and (15).

In some embodiments, the power controller is used to regulate the output voltage and/or operating current of at least one of the single-machine fuel cell systems. For example, the power controller may be a DC-DC converter, a DC-AC converter, etc.

The control parameter is a variable used to adjust or maintain a particular operational performance. For example, the control parameter includes a switching frequency, a duty cycle, etc., of the power controller.

The switching frequency is a count of times a switching element in a power controller opens and closes per unit of time.

The duty cycle is a percentage of total time that the switching element is "open" during a preset period.

In some embodiments, the processor determines the control parameters for controlling at least one power controller of the portion of the single-machine fuel cell systems with performance degradation based on formula (13). For example, the current and voltage of the single-machine fuel cell system corresponding to the power controller are used as the current density and the predicted voltage, respectively, in formula (13), and then the control parameters are determined by querying a table of parameter preset relationship.

In some embodiments, the table of parameter preset relationship may include a correspondence between the current density, the predicted voltage, and the control parameters of the single-machine fuel cell system. The table of parameter preset relationship may be determined based on historical experiments. For example, the table of parameter preset relationship is determined based on the current density, the predicted voltage, and the true control parameters of the single-machine fuel cell system in the historical data.

In some embodiments, the processor may realize control of the output voltage and/or operating current of the single-machine fuel cell system by adjusting the switching frequency and/or duty cycle of the power controller. For example, to increase the output voltage and/or operating current of the single-machine fuel cell system, the switching frequency or the duty cycle may be increased.

Figure 7:
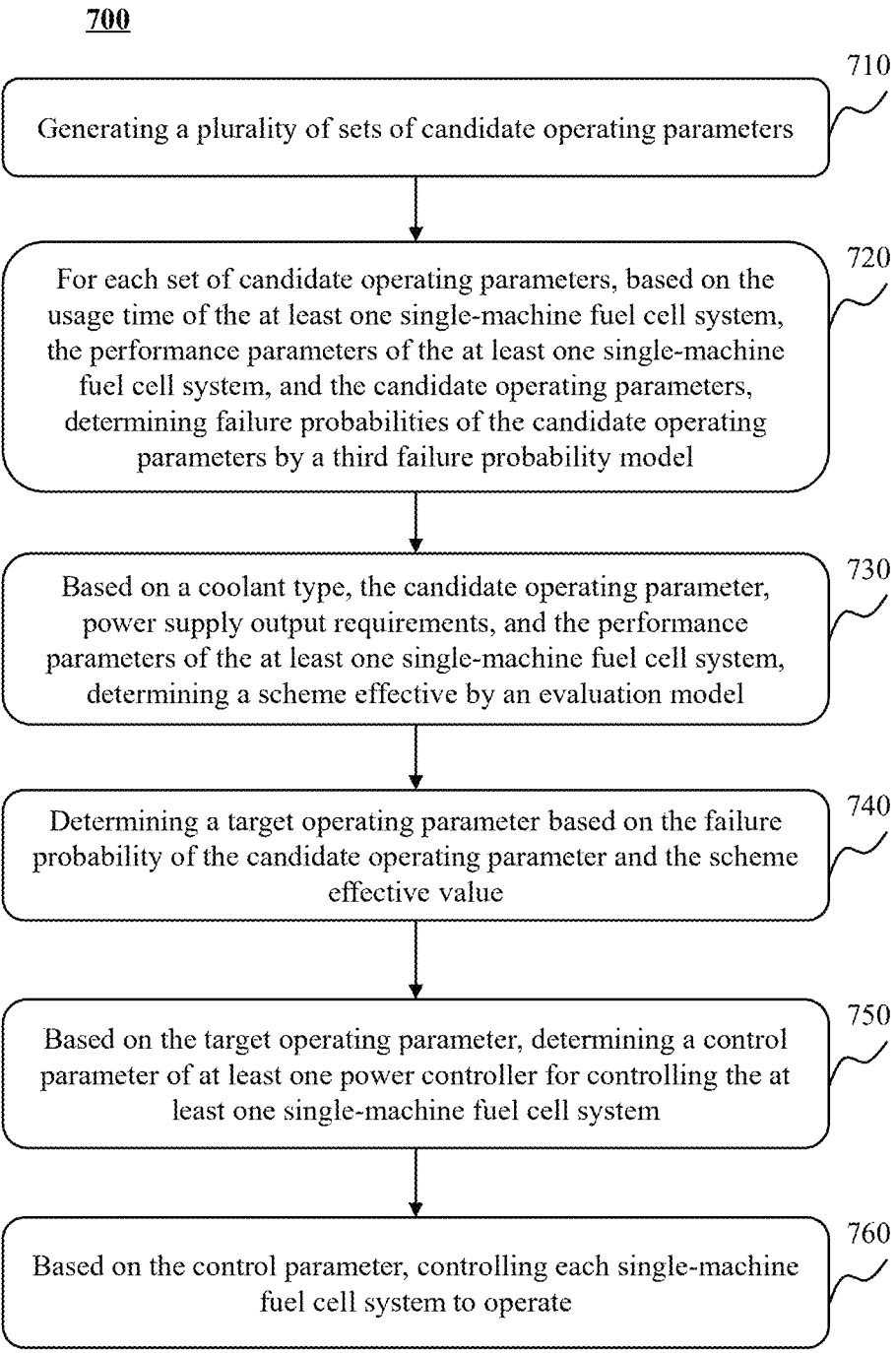
FIG. 7 is an exemplary flowchart for controlling operations of single-machine fuel cell systems according to an embodiment of the present disclosure.

More about the control parameters and controlling the operation of each single-machine fuel cell system can be found in FIG. 7 and its related description.

In some embodiments, if the portion of the single-machine fuel cell systems operate in a high current density for a long time, a performance damage rate of the single-machine fuel cell system may be excessively fast, thereby causing an excessively high expected performance attenuation rate of the single-machine fuel cell system with good original performance. Therefore, the expected performance attenuation rate among each of the single-system fuel cell systems should be considered during the operation selection. The prediction results are constrained by using formula (8) and formula (10), and the input time condition is 120 hours. That is, the performance of each of the single-machine fuel cell systems after 120 hours of operating in a hybrid operating mode is predicted. If the prediction result of the formula (8) does not exceed 5% and the prediction result of the formula (10) does not exceed 10%, the combined operating condition may be used. Otherwise, the operating condition is adjusted, that is, the selection is performed in the formula (14) again. In addition, after the operating conditions of some single-machine systems are adjusted by using the formulas (13) and (14), total heat output obtained by summing that of each of the single-machine fuel cell systems is required to be consistent with the total available heat $Q_u$ formula (15) during normal operation before the adjustment.

In addition, when the thermoelectric load ratio is low, the total redundancy of the single-machine fuel cell system is relatively high. That is, as shown in FIG. 5, the single-machine fuel cell system has a peak output power at the current density of 1.5 A/cm². However, in this case, the load of the single-machine fuel cell system is not high, the full-load operation is not required, and two operating modes (i.e., hybrid operating mode) may be selected.

A first operating mode: the portion of the single-machine fuel cell systems are powered off due to severe faults or no faults, but one or more single-machine fuel cell systems with high performance attenuation are powered off. The rest single-machine fuel cell systems with good performance operate.

A second operating mode: all the single-machine fuel cell systems are in operation and operating mode of each of the single-machine fuel cell systems is controlled.

In the case of high thermoelectric load ratio, the total redundancy of the single-machine fuel cell system is relatively low. That is, as shown in FIG. 5, if the rated output power of the single-machine system is 200 kW, the actual output power of the single-machine fuel cell system exceeds 80%, that is, 160 kW or more, the single-machine fuel cell system operates near full load, and two operating modes (i.e., hybrid operating mode) may be selected.

A first operating mode: the portion of the single-machine fuel cell systems are powered off due to severe faults. The remaining single-machine fuel cell systems with good performance operate with a full load. In this case, the load requirement cannot exceed the maximum output value that can be provided by the remaining single-machine systems.

A second operating mode: the single-machine fuel cell system has no fault, but performance of some parts deteriorates. In this case, all the single-machine fuel cell systems are in operation and the operating mode of each of the single-machine fuel cell systems is controlled.

In some embodiments, the processor uses a hybrid operating mode in respond to the performance degradation of a first preset count of single-machine fuel cell systems greater than a first preset magnitude.

In some embodiments, the first preset count and the first preset magnitude may be determined in a plurality of ways. For example, the processor generates a plurality of candidate parameter combinations of the first preset count and the first preset magnitude. Based on a candidate parameter combination, a usage time of the single-machine fuel cell system, and performance parameters of the single-machine fuel cell system, a failure probability of the candidate parameter combination is determined by a first failure probability model. The parameter combination of the first preset count and the first preset magnitude is determined based on the failure probability of the candidate parameter combination.

In some embodiments, the candidate parameter combinations of the first preset count and the first preset magnitude may be randomly generated, e.g., using a random number generator, etc.

The performance parameters include a fuel type, a fuel flow and pressure, an operating temperature, or the like, for a single-machine fuel cell system.

The first failure probability model is a machine learning model. For example, the first failure probability model is a Convolutional Neural Networks (CNN) model or the like.

In some embodiments, inputs to the first failure probability model include the candidate parameter combinations, the usage time of the single-machine fuel cell system, and the performance parameters of the single-machine fuel cell system. The output is the failure probability of the candidate parameter combination.

The failure probability of the candidate parameter combination is a likelihood that the single-machine fuel cell system may fail by using the candidate parameter combination. For example, the failure probability of the candidate parameter combination may be a value between 0 and 1.

In some embodiments, the first failure probability model may be trained by a large number of first training samples with a first label. The processor inputs a plurality of first training samples with the first label into an initial first failure probability model, a loss function is constructed from the first label and results of the initial first failure probability model, and the initial first failure probability model is iteratively updated based on the loss function. The training of the first failure probability model is completed when preset conditions are satisfied, and a trained first failure probability model is obtained. The preset conditions may be that the loss function converges, the count of iterations reaches a threshold, or the like.

In some embodiments, the first training samples for training the first failure probability model may be sample parameter combinations in the historical sample data, sample usage time and sample performance parameters of the sample single-machine fuel cell systems. The first label may be a future failure probability corresponding to the sample parameter combination.

In some embodiments, the future failure probability is positively correlated with the number of failures during a preset time period for subsequent detection and negatively correlated with the length of time for detection, and is determined by the following formula (16).

$$P = 1 - e\left(-\left(\frac{a}{b}\right)\right) \quad (16)$$

where P is a future failure probability, a is a count of failures in a preset time period for subsequent inspection, and b is a length of time for detection. The count of failures and the length of time for detection may be determined experimentally by a skilled professional.

In some embodiments, when the first failure probability model is trained, the processor determines a training set and a test set based on the performance parameters of different single-machine fuel cell systems in the first training samples. At each iteration, a learning rate of the first training samples is related to a system complexity of the first training samples.

In some embodiments, the processor classifies the performance parameters of the different single-machine fuel cell systems in levels, combines the classified performance parameters in pairs to form a plurality of combination levels, and divides the first training samples into a plurality of databases in accordance with the combination levels. For example, in response to the fact that the performance parameters include a fuel type and a fuel flow rate, the fuel type is divided into 2 levels, and the fuel flow rate is divided into 2 levels, and then 4 combination levels are formed by combining in pairs. Samples are then randomly drawn from each database according to a preset ratio to form the test set or the training set. The preset ratio is a ratio corresponding to the data contained in the test set and the training set.

In some embodiments, at each iteration, the learning rate of the first training samples is related to the system complexity of the first training samples. For example, in the kth iteration, when the parameters of the first failure probability model are updated by using a first training sample A, a learning rate factor used for the first training sample A is negatively correlated to the current iteration and positively correlated to the system complexity of the first training sample A. That is, the higher the system complexity, the higher the value of the first training sample. The learning rate is a hyperparameter used to control the step size for updating the model parameters each time during training the first failure probability model.

The system complexity may be characterized by a chemical reaction complexity of the single-machine fuel cell system included in the first training sample.

The chemical reaction complexity may be quantified by the count of formulas, or the count of products of the chemical reaction.

The processor ensures the diversity and representation of the training set and the test set by dividing the performance parameters of different single-machine fuel cell systems. At each iteration, the learning rate is adjusted according to the system complexity of the first training sample, which helps the first failure probability model to learn features from the training data more efficiently, and improves the generalization ability and prediction accuracy.

In some embodiments, the processor determines the parameter combination of the first preset count and the first preset magnitude based on the failure probabilities of the candidate parameter combinations. For example, the candidate parameter combination corresponding to the lowest failure probability of the candidate parameter combination is determined as the parameter combination of the first preset count and the first preset magnitude.

The processor may select an optimal parameter combination by generating a plurality of candidate parameter combinations and evaluating the future failure probability of each candidate parameter combination, so as to safeguard the subsequent operation of the single-machine fuel cell system.

The processor facilitates the subsequent implementation of the actual solution by specifying the operating conditions of the hybrid mode.

In some embodiments, the processor uses the hybrid operating mode when the performance degradation magnitude of at least one single-machine fuel cell system is greater than a second preset magnitude.

In some embodiments, the processor may further use the hybrid operating mode when the performance degradation magnitude of at least one single-machine fuel cell system is greater than the second preset magnitude, or the performance degradation magnitude of a first preset count of single-machine fuel cell systems is greater than the first preset magnitude.

In some embodiments, the processor may further use the hybrid operating mode when both the performance degradation magnitude of at least one single-machine fuel cell system is greater than the second preset magnitude and the performance degradation magnitude of the first preset count of single-machine fuel cell systems is greater than the first preset magnitude.

In some embodiments, the second preset magnitude may be determined in a plurality of ways. For example, the processor generates a plurality of second candidate magnitudes. Based on the second candidate magnitudes, the usage time of the single-machine fuel cell system, and the performance parameters, failure probabilities of the second candidate magnitudes are determined by a second failure probability model. The second preset magnitude is determined based on the failure probability of the second candidate magnitude. For example, the second candidate magnitude corresponding to the lowest failure probability is used as the second preset magnitude.

The failure probability of the second candidate magnitude is similar to the failure probability of the candidate parameter combination, as can be seen in the relevant previous description.

In some embodiments, the second fault probability model may be trained based on a large number of second training samples with a second label. The second failure probability model is similar to the first failure probability model, with the difference being that the inputs and outputs of the two models are different. For a training process of the second failure probability model, it may refer to the foregoing related description of the training process of the first failure probability model.

In some embodiments, the second training samples for training the second failure probability model may be a sample second preset magnitude, a sample usage time, and a sample performance parameter in the historical sample data. The second label may be a future failure probability corresponding to the sample second preset magnitude. The second label is obtained in a similar manner as the first label.

The processor generates a plurality of second candidate magnitudes, evaluates the subsequent future failure probability of each second candidate magnitude, thereby ensuring the safety of subsequent operation of the single-machine fuel cell system, and selecting an optimal second preset magnitude.

The processor uses the hybrid operating mode in response to the performance degradation magnitude of at least one single-machine fuel cell system being greater than the second preset magnitude, so as to ensure that the multi-machine fuel cell system maintains higher operation efficiency, reliability, and lifetime even in the event that performance of a portion of the single-machine fuel cell systems degrades.

FIG. 7 is an exemplary flowchart for controlling operations of the single-machine fuel cell systems according to an embodiment of the present disclosure. As shown in FIG. 7, step 700 may include the following steps.

In Step 710, a plurality of sets of candidate operating parameters are generated.

In some embodiments, each set of candidate operating parameters includes a first control parameter and a second control parameter.

In some embodiments, the processor may randomly select $n_1$ single-machine fuel cell systems from a portion of the single-machine fuel cell systems with performance degradation. The aforementioned $n_1$ single-machine fuel cell systems are operated under one of the operating conditions where the expected performance attenuation rate calculated by formula (13) is less than or equal to a rate threshold (e.g., it is randomly selected from the operating conditions where the expected performance attenuation rate is less than or equal to the rate threshold). The operating condition (e.g., an operating value corresponding to the current density) of each of the selected $n_1$ single-machine fuel cell systems is used as the first control parameter.

The rate threshold may be set by default by specialized technician.

In some embodiments, the processor may select $n_2$ (e.g., randomly selected from the single-machine fuel cell systems with an expected performance attenuation rate less than or equal to the rate threshold) single-machine fuel cell systems with the expected performance attenuation rate less than or equal to the rate threshold based on the calculations of formula (8). The foregoing $n_2$ single-machine fuel cell systems are operated under one of the operating conditions in formula (13) with the current density greater than or equal to the rate threshold (e.g., randomly selected from the operating conditions with current density greater than or equal to the current threshold). The operating condition (e.g., an operating value corresponding to the current density) of each of the selected $n_2$ single-machine fuel cell systems is used as the second control parameter. The current threshold may be set by default by the specialized technician.

The number of $n_1$ and $n_2$ may be set by default by the specialized technician.

In some embodiments, the processor takes the above first control parameter and the second control parameter as a set of candidate operating parameters. By repeating the above steps, a plurality of sets of candidate operating parameters can be generated.

In step 720, for each set of candidate operating parameters, based on the usage time of the at least one single-machine fuel cell system, the performance parameters of the at least one single-machine fuel cell system, and the candidate operating parameters, failure probabilities of the candidate operating parameters are determined by a third failure probability model.

The failure probability of the candidate operating parameter is similar to the failure probability of the candidate parameter combination.

In some embodiments, the third failure probability model may be trained based on a large number of third training samples with a third label. The third failure probability model is similar to the first failure probability model, with the difference that the inputs and outputs of the models are different. For a training process of the third failure probability model, it may refer to the foregoing related description of the training process of the first failure probability model.

In some embodiments, the third training samples for training the third failure probability model may be a sample usage time, a sample performance parameter, and a sample operating parameter in the historical sample data. The third label may be a future failure probability corresponding to the sample operating parameter. The third label is obtained in a similar manner as the first label.

In step 730, based on a coolant type, the candidate operating parameter, power supply output requirements, and the performance parameters of the at least one single-machine fuel cell system, a scheme effective value is determined by an evaluation model.

The power supply output requirements are current and voltage requirements for output electrical energy from the multi-machine or single-machine fuel cell system.

The scheme effective value is effectiveness of the candidate operating parameters. For example, the amount of increase to the output power and heat. The larger the scheme effective value, the more effective the candidate operating parameters.

The evaluation model is a machine learning model. For example, the evaluation model is a Convolutional Neural Networks (CNN) model, etc.

In some embodiments, the evaluation model may be trained based on a large number of fourth training samples with a fourth label. For the training process of the evaluation model, it may be referred to the training process of the first failure probability model.

In some embodiments, the fourth training samples for training the evaluation model may be sample coolant types, sample operating parameters, sample power supply output requirements, sample performance parameters in the historical sample data. The fourth label may be an actual scheme effective value.

In some embodiments, the processor may use the subsequent increase in heat ratio of the multi-machine fuel cell system detected in a subsequent preset period of time as the actual scheme effective value. For example, a difference between the output heat after adopting the operating parameters and the output heat before adopting the candidate operating parameters may be calculated first, and then the ratio of the difference divided by the output heat before adopting the candidate operating parameters may be used as the subsequent increase in heat ratio.

In step 740, a target operating parameter is determined based on the failure probability of the candidate operating parameter and the scheme effective value.

In some embodiments, the processor may determine the target operating parameter based on the failure probability of the candidate operating parameter and the scheme effective value in a variety of ways. For example, the evaluation data is positively correlated with the failure probability of the candidate operating parameter and negatively correlated with the scheme effective value. The evaluation data is determined by the following formula (17), and the smallest evaluation data is used as the target operating parameter.

$$d = w_1 \times f + \frac{w_2}{g} \quad (17)$$

where d is the evaluation data, f is the failure probability of the candidate operating parameter, g is the scheme effective value, and, $w_1$, $w_2$ are weighting coefficients, which may be obtained preset.

The evaluation data is a value used to evaluate the impact of different candidate operating parameters on a single-machine fuel cell system.

In some embodiments, the weighting coefficients are related to the failure probability of the determined parameter combination and/or the failure probability of the second candidate magnitude. For example, in response to the failure probability of the determined parameter combination or the failure probability of the second candidate magnitude being greater than a preset failure threshold, the greater the failure probability of a parameter (e.g., the determined parameter combination or the second preset magnitude) that is greater than the preset failure threshold, the greater the $w_1$. In response to the failure probability of the determined parameter combination and the failure probability of the second candidate magnitude being greater than the preset failure threshold, a mean value of the failure probability of the determined parameter combination and the failure probability of the second candidate magnitude is determined. The greater the mean value, the greater the $w_2$.

The determined parameter combination is the first preset count and the first preset magnitude determined as described previously.

The failure probability of the determined parameter combination may be determined by the first failure probability model, and the failure probability of the second preset magnitude may be determined by the second failure probability model.

Since the candidate parameter combination, and the second preset magnitude are parameters that control the hybrid operating mode, the greater the failure probability of the candidate parameter combination and/or the failure probability of the second candidate magnitude, the greater the risk of the hybrid operating mode. By increasing the weighting coefficients, it is possible to amplify the focus on the current operating failure so that the overall risk can be controlled more effectively, and ultimately a more optimal operating parameter can be selected.

In step 750, based on the target operating parameter, a control parameter of at least one power controller for controlling the at least one single-machine fuel cell system is determined.

In some embodiments, the processor determines a first control parameter or a second control parameter of the single-machine fuel cell systems based on the target operating parameters, thereby determining a current density, a predicted voltage for each single-machine fuel cell system, and then determines the control parameter by querying a table of parameter preset relationship.

More about the table of parameter preset relationship can be found in FIG. 1 and its related description.

In step 760, based on the control parameter, each single-machine fuel cell system is controlled to operate.

More about controlling each single-machine fuel cell system to operate can be found in FIG. 1 and its related description.

By considering the risks during the hybrid operating mode, and by comprehensively evaluating the operation effects, it is possible to select the hybrid operating mode corresponding to the target operating parameter with the best overall effect.

Figure 8:
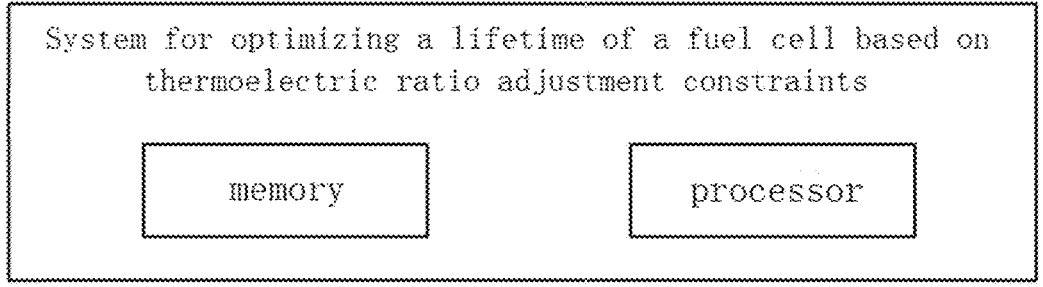
FIG. 8 is a schematic structural diagram of a system for optimizing a lifetime of a fuel cell system based on adjustment and constraint of a thermoelectric ratio according to an embodiment of the present disclosure.

According to a second embodiment of the present disclosure, referring to FIG. 8, the present disclosure requests to protect a system for optimizing a lifetime of a fuel cell based on adjustment and constraint of a thermoelectric ratio includes:

one or more processors;
a memory storing one or more programs, when the one or more programs are executed by the one or more processors, the one or more processors perform the method for optimizing a lifetime of a fuel cell based on adjustment and constraint of a thermoelectric ratio. A person skilled in the art can understand that various variations and improvements may occur to the content disclosed in this disclosure. For example, various devices or components described above may be implemented by hardware, or may be implemented by software, firmware, or some or all combinations of the three.

Flowcharts are used in the present disclosure to illustrate the steps of the method according to the embodiments of the present disclosure. It should be understood that the previous or subsequent steps are not necessarily performed in exact order. Instead, the various steps may be processed in reverse order or simultaneously. At the same time, other operations may also be added to these processes.

A person skilled in the art will appreciate that all or part of the steps in the above method may be completed by instructing the relevant hardware through a computer program, and the program may be stored in a computer-readable storage medium, such as a read-only memory, a disk or an optical disk. Alternatively, all or part of the steps in the above embodiment may also be implemented using one or more integrated circuits. Accordingly, each module/unit in the above embodiment may be implemented in the form of hardware or in the form of a software functional module. The present disclosure is not limited to any particular form of combination of hardware and software.

Unless otherwise defined, all terms used herein have the same meaning as commonly understood by one of ordinary skill in the art to which the present disclosure pertains. It should also be understood that terms such as those defined in common dictionaries should be interpreted as having a meaning consistent with their meaning in the context of the relevant art and should not be interpreted in an idealized or highly formal sense unless expressly so defined herein.

The above is an illustration of the present disclosure and should not be considered as a limitation thereto. Although several exemplary embodiments of the present disclosure have been described, those skilled in the art will readily appreciate that many modifications may be made to the exemplary embodiments without departing from the novel teachings and advantages of the present disclosure. Therefore, all such modifications are intended to be included within the scope of the present disclosure as defined by the claims. It should be understood that the above is an illustration of the present disclosure and should not be considered as limited to the specific embodiments disclosed, and modifications to the disclosed embodiments as well as other embodiments are intended to be included within the scope of the appended claims. The present disclosure is defined by the claims and their equivalents.

In the description of this specification, the reference terms "one embodiment", "some embodiments", "illustrative embodiments", "examples", "specific examples", or "some examples" mean that the specific features, structures, materials or characteristics described in conjunction with the embodiment or example are included in at least one embodiment or example of the present disclosure. In this specification, the schematic representation of the above terms does not necessarily refer to the same embodiment or example. Moreover, the specific features, structures, materials or characteristics described may be combined in any one or more embodiments or examples in a suitable manner.

Although the embodiments of the present disclosure have been shown and described, it will be understood by those skilled in the art that various changes, modifications, substitutions and variations may be made to these embodiments without departing from the principles and purpose of the present disclosure, and the scope of this specification is defined by the claims and their equivalents.

What is claimed is:

1. A method for optimizing a lifetime of a fuel cell system based on adjustment and constraint of a thermoelectric ratio, applied to a multi-machine fuel cell system including a plurality of single-machine fuel cell systems, the method comprising:

obtaining an initial reference voltage of each of the plurality of single-machine fuel cell systems in the multi-machine fuel cell system under a normal operating condition, and performing a durability test on the plurality of single-machine fuel cell systems to obtain a variation relationship of a reference voltage over time of each of the plurality of single-machine fuel cell systems;

monitoring an operating voltage of each of the plurality of single-machine fuel cell systems during a real operation in real-time under the normal operating condition to obtain a real-time monitored voltage and a real-time voltage deviation of each of the plurality of single-machine fuel cell systems;

calculating, according to the variation relationship of the reference voltage over time and the real-time monitored voltage of each of the plurality of single-machine fuel cell systems, a performance expected attenuation profile of each of the plurality of single-machine fuel cell systems under the normal operating condition;

obtaining a performance expected attenuation profile and an available heat profile of each of the plurality of single-machine fuel cell systems when operating at each of one or more current density points, and calculating a health state boundary of each of the plurality of single-machine fuel cell systems in stable operation;

optimizing an operating mode of each of the plurality of single-machine fuel cell systems by using the available heat profile, the performance expected attenuation profile, and the health state boundary of each of the plurality of single-machine fuel cell systems; wherein the obtaining the initial reference voltage of each of the plurality of single-machine fuel cell systems in the multi-machine fuel cell system under the normal operating condition further includes that:

an initial voltage matrix of the plurality of single-machine fuel cell systems is expressed as:

$$V_{initial} = [V_1, V_2, V_3, V_4 \ldots] \quad (2)$$

wherein, $V_{initial}$ is an initial reference voltage of a fuel cell subsystem, $V_1$, $V_2$, $V_3$, and $V_4$ are the initial reference voltages of the plurality of single-machine fuel cell systems No. 1, No. 2, No. 3, No. 4 in a specified state;

if the initial reference voltage of each of the plurality of single-machine fuel cell systems is deviated from each other by a preset deviation value, the plurality of single-machine fuel cell systems need to be replaced at an initial stage;

the performing the durability test on the plurality of single-machine fuel cell systems to obtain the variation relationship of the reference voltage over time of each of the plurality of single-machine fuel cell systems further includes:

obtaining a corresponding fitting formula according to performance differences of different single-machine fuel cell systems;

using a fitting manner of subtracting a reference voltage at a start of the durability test from a reference voltage at an end of the durability test or a linear fitting manner in a fitting process, and a prediction voltage matrix $V_{pc}$ of the variation relationship of the reference voltage over time of the multi-machine fuel cell systems being expressed as:

$$V_{pc} = [M_1, M_2, M_3, M_4 \ldots] \quad (3)$$

wherein, 1, 2, 3, and 4 are numbers of the plurality of single-machine fuel cell systems, and $M_1$, $M_2$, $M_3$, and $M_4$ are forms of the prediction voltage of the plurality of single-machine fuel cell systems No. 1, No. 2, No. 3, and No. 4—variation relationship of the reference voltage over time;

the monitoring the operating voltage of each of the plurality of single-machine fuel cell systems during the real operation in real-time under the normal operating condition to obtain the real-time monitored voltage and the real-time voltage deviation of each of the plurality of single-machine fuel cell systems further includes that:

a real-time monitored voltage matrix $V_{rt}$ of the variation relationship of each of the plurality of single-machine fuel cell systems over operating time is:

$$V_{rt} = [V_{rt1}, V_{rt2}, V_{rt3}, V_{rt4} \ldots] \quad (4)$$

wherein, 1, 2, 3, and 4 are numbers of the plurality of single-machine fuel cell systems;

correcting a prediction voltage matrix $V_{pcn}$ in a control policy in real-time according to a real-time voltage monitoring situation;

$$V_{pcn} = [M_1 + \varepsilon_1 M_1, M_2 + \varepsilon_2 M_2, M_3 + \varepsilon_3 M_3, M_4 + \varepsilon_4 M_4 \ldots] \quad (5)$$

$$\varepsilon_1 = \frac{V_{rt1} - M_1}{M_1}, \varepsilon_2 = \frac{V_{rt2} - M_2}{M_2}, \ldots \quad (6)$$

wherein, ε is a correction coefficient;

obtaining a real-time voltage deviation matrix $\eta_{rt}$ between each of the plurality of single-machine fuel cell systems;

$$\eta_{rt} = [\eta_1, \eta_2, \eta_3, \eta_4 \ldots] \quad (7)$$

$$\eta_1 = \frac{\text{Max}[V_{rt1}, V_{rt2}, V_{rt3}, V_{rt4} \ldots] - V_{rt1}}{\text{Max}[V_{rt1}, V_{rt2}, V_{rt3}, V_{rt4} \ldots]} \times 100\%$$

$$\eta_2 = \frac{\text{Max}[V_{rt1}, V_{rt2}, V_{rt3}, V_{rt4} \ldots] - V_{rt2}}{\text{Max}[V_{rt1}, V_{rt2}, V_{rt3}, V_{rt4} \ldots]} \times 100\%$$

wherein, η is a deviation percentage;

the calculating, according to the variation relationship of the reference voltage over time and the real-time monitored voltage of each of the plurality of single-machine fuel cell systems, the performance expected attenuation profile of each of the plurality of single-machine fuel cell systems under the normal operating condition further includes:

obtaining a prediction voltage deviation matrix $\eta_{prt}$ between each of the plurality of single-machine fuel cell systems according to a prediction voltage matrix $V_{pc}$ of the variation relationship of the reference voltage over time of each of the plurality of single-machine fuel cell systems and a real-time corrected prediction voltage matrix $V_{pcn}$ as the performance expected attenuation profile of each of the plurality of single-machine fuel cell systems under the normal operating condition;

$$\eta_{prt} = [\eta_{p1}, \eta_{p2}, \eta_{p3}, \eta_{p4} \ldots] \quad (8)$$

$$\eta_{p1} = \frac{\text{Max}[M_1 + \eta_1 M_1, M_2 + \eta_2 M_2, M_3 + \eta_3 M_3, M_4 + \eta_4 M_4 \ldots] - (M_1 + \eta_1 M_1)}{\text{Max}[M_1 + \eta_1 M_1, M_2 + \eta_2 M_2, M_3 + \eta_3 M_3, M_4 + \eta_4 M_4 \ldots]} \times 100\%$$

$$\eta_{p2} = \frac{\text{Max}[M_1 + \eta_1 M_1, M_2 + \eta_2 M_2, M_3 + \eta_3 M_3, M_4 + \eta_4 M_4 \ldots] - (M_2 + \eta_2 M_2)}{\text{Max}[M_1 + \eta_1 M_1, M_2 + \eta_2 M_2, M_3 + \eta_3 M_3, M_4 + \eta_4 M_4 \ldots]} \times 100\%$$

...

calculating an expected performance attenuation rate matrix $\varphi_{prt}$ of each of the plurality of single-machine fuel cell systems:

$$\varphi_{prt} = [\varphi_{p1}, \varphi_{p2}, \varphi_3, \varphi_4 \ldots] \quad (9)$$

$$\varphi_{p1} = \frac{V_1 - M_1}{V_1}$$

$$\varphi_{p2} = \frac{V_2 - M_2}{V_2}$$

...

wherein an expected performance attenuation rate deviation matrix $\delta_{prt}$ of each of the plurality of single-machine fuel cell systems is calculated:

$$\delta_{prt} = [\delta_{p1}, \delta_{p2}, \delta_{p3}, \delta_{p4} \ldots] \quad (10)$$

$$\delta_{p1} = \frac{\text{Max}[\varphi_{p1}, \varphi_{p2}, \varphi_{p3}, \varphi_{p4} \ldots] - \varphi_{p1}}{\text{Max}[\varphi_{p1}, \varphi_{p2}, \varphi_{p3}, \varphi_{p4} \ldots]} \times 100\%$$

$$\delta_{p2} = \frac{\text{Max}[\varphi_{p1}, \varphi_{p2}, \varphi_{p3}, \varphi_{p4} \ldots] - \varphi_{p2}}{\text{Max}[\varphi_{p1}, \varphi_{p2}, \varphi_{p3}, \varphi_{p4} \ldots]} \times 100\%$$

...

wherein formula (8) represents performance deviation between each of the plurality of single-machine fuel cell systems; formula (10) represents expected performance attenuation rate deviation between each of the plurality of single-machine fuel cell systems;

the obtaining the performance expected attenuation profile and the available heat profile of each of the plurality of single-machine fuel cell systems when operating at each of the one or more current density points, and calculating the health state boundary of each of the plurality of single-machine fuel cell systems in stable operation further includes that:

heat generation Q is shown in formula (11) and output power P is shown in formula (12):

$$Q = Q_r + Q_c \quad (11)$$

wherein $Q_r$ represents reaction heat generation, $Q_c$ represents ohmic heat, and both are related to a current density during operation;

$$P = V_{rt} I \quad (12)$$

wherein I represents the current during the operation, which is equal to a current density multiplied by an active area, and the active area is a known design parameter;

obtaining a prediction voltage matrix $V_{pci}$ of the variation relationship of the reference voltage over time under different current densities at an interval of every 0.2 A/cm² when each of the plurality of single-machine fuel cell systems operates at a preset current density range:

$$V_{pci-0.8} = [N_1, N_2, N_3, N_4 \ldots] \quad (13)$$

$$V_{pci-1.0} = [S_1, S_2, S_3, S_4 \ldots]$$

$$V_{pci-1.2} = [G_1, G_2, G_3, G_4 \ldots]$$

...

wherein N, S, and G have the same meaning as M in formula (3), and if the prediction voltage matrix M of a single-machine fuel cell system of the plurality of single-machine fuel cell systems with a certain number is adjusted to a form in N, S, and G, corresponding calculation is replaced in formula (9);

0.8, 1.0, and 1.2 are current density values, in units of A/cm²;

a relationship matrix $Q_p$ between actual available heat and the current density is obtained by using formula (14):

$$Q_p = [Q_{p0.8}, Q_{p1.0}, Q_{p1.2}, Q_{p1.4}, Q_{p1.6}, Q_{p1.8}...] \quad (14)$$

$$Q_{p0.8} = cm_{0.8}\Delta T_{0.8}$$

$$Q_{p1.0} = cm_{1.0}\Delta T_{1.0}$$

...

wherein c represents a heat capacity of a coolant, which is a known amount determined according to a type of the coolant, m represents a coolant flow rate, which is a known amount read by a flow meter, $\Delta T$ is a temperature difference of the coolant at inlet and outlet of the plurality of single-machine fuel cell systems, which is a known amount read by temperature sensors at the inlet and the outlet, 0.8, 1.0, and 1.2 are the current density values, in units of $A/cm^2$;

by using formula (15), an available heat $Q_u$ in the normal operating condition is obtained:

$$Q_u = cm_u \Delta T_u \quad (15)$$

formula (15) is applicable to all the plurality of single-machine fuel cell systems before adjustment, $m_u$ represents a coolant flow rate under the normal operating condition, and $\Delta T_u$ represents a temperature difference of the coolant at the inlet and outlet of the system under the normal operating condition;

after operating conditions of a portion of the plurality of single-machine fuel cell systems are adjusted by using formula (13) and formula (14), a total heat output obtained by summing each of the plurality of single-machine fuel cell systems is consistent with the total available heat $Q_u$ during normal operation before the adjustment;

the optimizing the operating mode of each of the plurality of single-machine fuel cell systems by using the available heat profile, the performance expected attenuation profile, and the health state boundary of each of the plurality of single-machine fuel cell systems further includes:

adjusting the operating mode of each of the plurality of single-machine fuel cell systems by using the prediction voltage deviation matrix between each of the plurality of single-machine fuel cell systems and the expected performance attenuation rate deviation matrix of each of the plurality of single-machine fuel cell systems, wherein a relationship matrix between the actual available heat and the current density is used as a constraint condition to obtain a heat output;

if the voltage deviation in the real-time voltage deviation matrix between each of the plurality of single-machine fuel cell systems is not less than a first preset value when each of the plurality of single-machine fuel cell systems is in stable operation, performing an adjustment;

the optimizing the operating mode of each of the plurality of single-machine fuel cell systems by using the performance expected attenuation profile and the health state boundary of each of the plurality of single-machine fuel cell systems further includes:

if the performance of a portion of the plurality of single-machine fuel cell systems is degraded, using a hybrid operating mode including that:

the portion of the plurality of single-machine fuel cell systems whose performance is degraded operates in an operating condition with a low attenuation rate calculated by the formula (13), if total output power or heat is insufficient, one or more single-machine fuel cell systems with a minimum attenuation calculated by the formula (8) operate in an operating condition with a high current density in formula (13);

combined total power and heat output values of the operating current and output voltage required by all the single-machine fuel cell systems are calculated by using the formulas (12), (14), and (15).

2. The method according to claim 1, wherein before obtaining the initial reference voltage of each of the plurality of single-machine fuel cell systems in the multi-machine fuel cell system under the normal operating condition, the method further comprises that:

a variation spectrum of a condition of the multi-machine fuel cell system over time is expressed as follows:

$$Q_{output} = \Sigma f(C_i t_i, C_j Q_{rated}, C_k t_j, C_m Q_{rated}) \quad (1)$$

wherein $Q_{output}$ is output power of the multi-machine fuel cell system, $Q_{rated}$ is a rated power, $\Sigma$ is combination forms of addition and subtraction under operating states in different modes, which combine a complete operating condition, $f$ represents a function feature in different states, C represents an coefficient factor in the different states, which is equal to the output power in a certain state divided by the rated power, t represents different operating times, subscripts i, j, and k of t are applicable to different operating time ranges, and subscripts i, j, k, and m of C represent different values in different operating times.

3. A system configured for optimizing a lifetime of a fuel cell based on adjustment and constraint of a thermoelectric ratio, comprising:

one or more processors; and a memory storing one or more programs, when the one or more programs are executed by the one or more processors, the one or more processors perform the method for optimizing a lifetime of a fuel cell based on adjustment and constraint of a thermoelectric ratio according to claim 1.

* * * * *